(12) United States Patent
Gamble (10) Patent No.: US 7,147,001 B2
(45) Date of Patent: Dec. 12, 2006

(54) FUEL-TRANSFER SYSTEM

(75) Inventor: Jimmy Dean Gamble, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 392 days.

(21) Appl. No.: 10/810,982

(22) Filed: Mar. 26, 2004

(65) Prior Publication Data

US 2005/0211311 A1 Sep. 29, 2005

(51) Int. Cl.
*F16K 15/03* (2006.01)
*B65B 1/04* (2006.01)

(52) U.S. Cl. ............................ 137/527.4; 137/527.6; 137/592

(58) Field of Classification Search ............... 137/527, 137/527.2, 527.4, 527.6, 527.8, 587, 592
See application file for complete search history.

(56) References Cited

U.S. PATENT DOCUMENTS

| | | | | |
|---|---|---|---|---|
| 2,048,943 A | * | 7/1936 | Munn | 137/527.4 |
| 2,247,509 A | | 7/1941 | Lebus | |
| 2,312,290 A | * | 2/1943 | Smith et al. | 137/527.4 |
| 2,578,590 A | * | 12/1951 | Perrault | 137/527.4 |
| 5,568,828 A | | 10/1996 | Harris | |
| 6,056,029 A | | 5/2000 | Devall et al. | |
| 6,234,195 B1 | * | 5/2001 | Kippe et al. | 137/527.6 |
| 6,240,957 B1 | * | 6/2001 | Hattori | 137/527.6 |
| 6,648,016 B1 | * | 11/2003 | Farrenkopf et al. | 137/592 |
| 6,932,100 B1 | * | 8/2005 | Martin et al. | 137/527.6 |
| 6,959,727 B1 | * | 11/2005 | Krishnamoorthy et al. | 137/592 |
| 2003/0116202 A1 | * | 6/2003 | Krishnamoorthy et al. | 137/593 |

FOREIGN PATENT DOCUMENTS

EP 0864456 A2 9/1998
JP 07096757 A 4/1995

OTHER PUBLICATIONS

European Examination Report for application No. 05251975.8—15232, 6 pages, dated Jun. 4, 2006.
Patent Abstracts of Japan, vol. 1995, No. 7, Aug. 31, 1995.
European Search Report for application No. 05251975.8—2422 PCT, 4 pages, dated Jul. 21, 2005.

* cited by examiner

*Primary Examiner*—John Rivell
(74) *Attorney, Agent, or Firm*—Barnes & Thornburg LLP (57) ABSTRACT

A fuel-transfer system is provided for a fuel system of a vehicle. The fuel-transfer system includes a filler neck and a fuel tank having top and bottom walls. The fuel-transfer system includes a tube and a fuel conductor. The fuel conductor includes a housing and a diverter valve positioned to lie in the housing. The diverter valve is configured to intercept and guide the tube through an outlet of the housing into a fuel tank.

40 Claims, 7 Drawing Sheets

FUEL-TRANSFER SYSTEM

BACKGROUND

The present disclosure relates to a fuel-transfer system, and particularly to a vehicle filler neck and a valve for regulating flow of liquid fuel between the vehicle filler neck and a vehicle fuel tank. More particularly, the disclosure relates to a filler neck inlet check valve unit.

A filler neck is a tube which conducts liquid fuel from a fuel-dispensing pump nozzle to an interior fuel-storage region in a fuel tank. Although an opened passageway through the filler neck into the fuel tank is needed during refueling to conduct liquid fuel from the pump nozzle into the fuel tank, it is desirable to close the filler neck at other times to block discharge of liquid fuel and fuel vapor from the fuel tank through the filler neck.

On occasion, it is necessary for mechanics to remove liquid fuel from the fuel tank during maintenance or repair of a vehicle. To remove the liquid fuel, a mechanic or other individual often inserts a siphon tube through the filler neck into the fuel tank and siphons or otherwise pumps the liquid fuel from the fuel tank.

SUMMARY

According to the present disclosure, a fuel-transfer system includes a fuel tank and a fuel conductor coupled to the fuel tank. The fuel conductor includes a housing having a fuel-transfer channel and a diverter valve positioned to lie in communication with the fuel-transfer channel. The diverter valve is movable from a closed position blocking the flow of fuel vapor or liquid fuel through the channel to an opened position permitting the flow of fuel vapor or liquid fuel through the channel.

In illustrative embodiments, the diverter valve includes a siphon tube deflector adapted to intercept and divert a siphon tube moving in a fuel tank filler neck and guide it toward a bottom wall of the fuel tank. Fin-shaped siphon tube guides are coupled to a cylindrical interior wall of the housing and arranged in circumferentially spaced-apart relation to provide means for centering or otherwise orienting a siphon tube moving through the fuel-transfer channel to aim a tip of that siphon tube to contact the siphon tube deflector included in the diverter valve to deflect the moving siphon tube into the fuel tank to reach liquid fuel extant in the fuel tank.

In illustrative embodiments, the fuel conductor includes a modular tank inlet check valve apparatus including the diverter valve. The apparatus includes a valve mover coupled to the diverter valve and pivotably coupled to a valve carrier formed to include the fuel-transfer channel and a biasing spring acting between the valve carrier and valve mover normally to move the diverter valve to engage a valve seat associated with the fuel-transfer channel to establish the closed position.

In illustrative embodiments, means is provided for coupling the diverter valve to the valve mover to allow rotary motion of the diverter valve relative to the valve mover in every direction. Such a coupling enhances mating engagement of the diverter valve and an annular valve seat associated with the fuel-transfer channel to block flow of fuel through the fuel-transfer channel upon movement of the diverter valve to the closed position.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
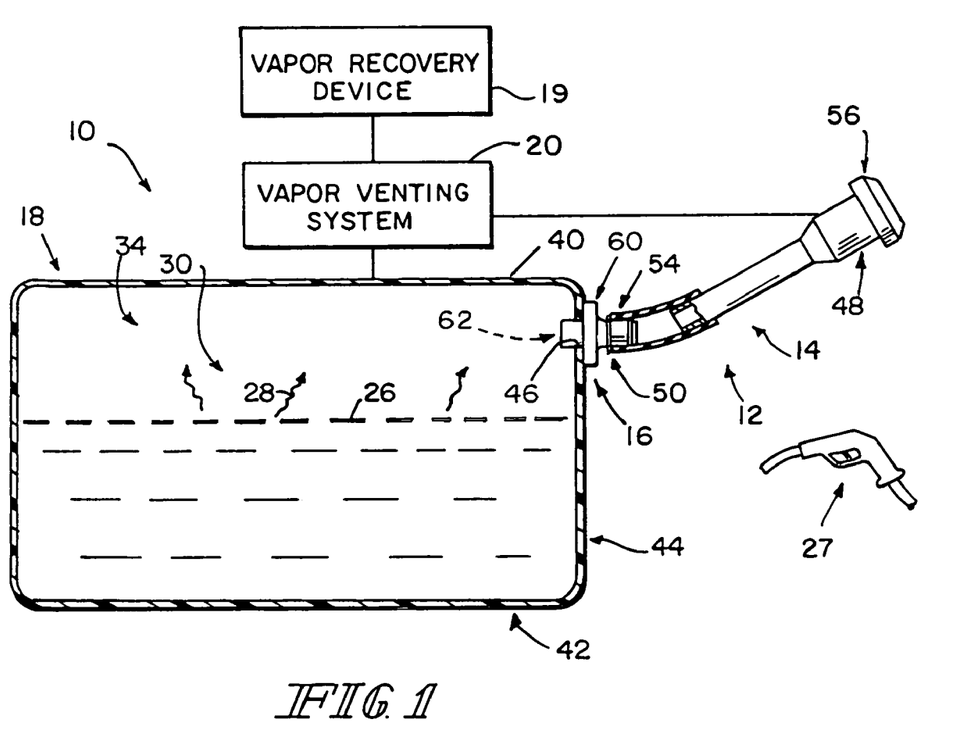
FIG. 1 is a diagrammatic view of a vehicle fuel system having a filler neck coupled to a fuel tank and a fuel conductor in accordance with the present disclosure interposed between the fuel tank and the filler neck.
Figure 10:
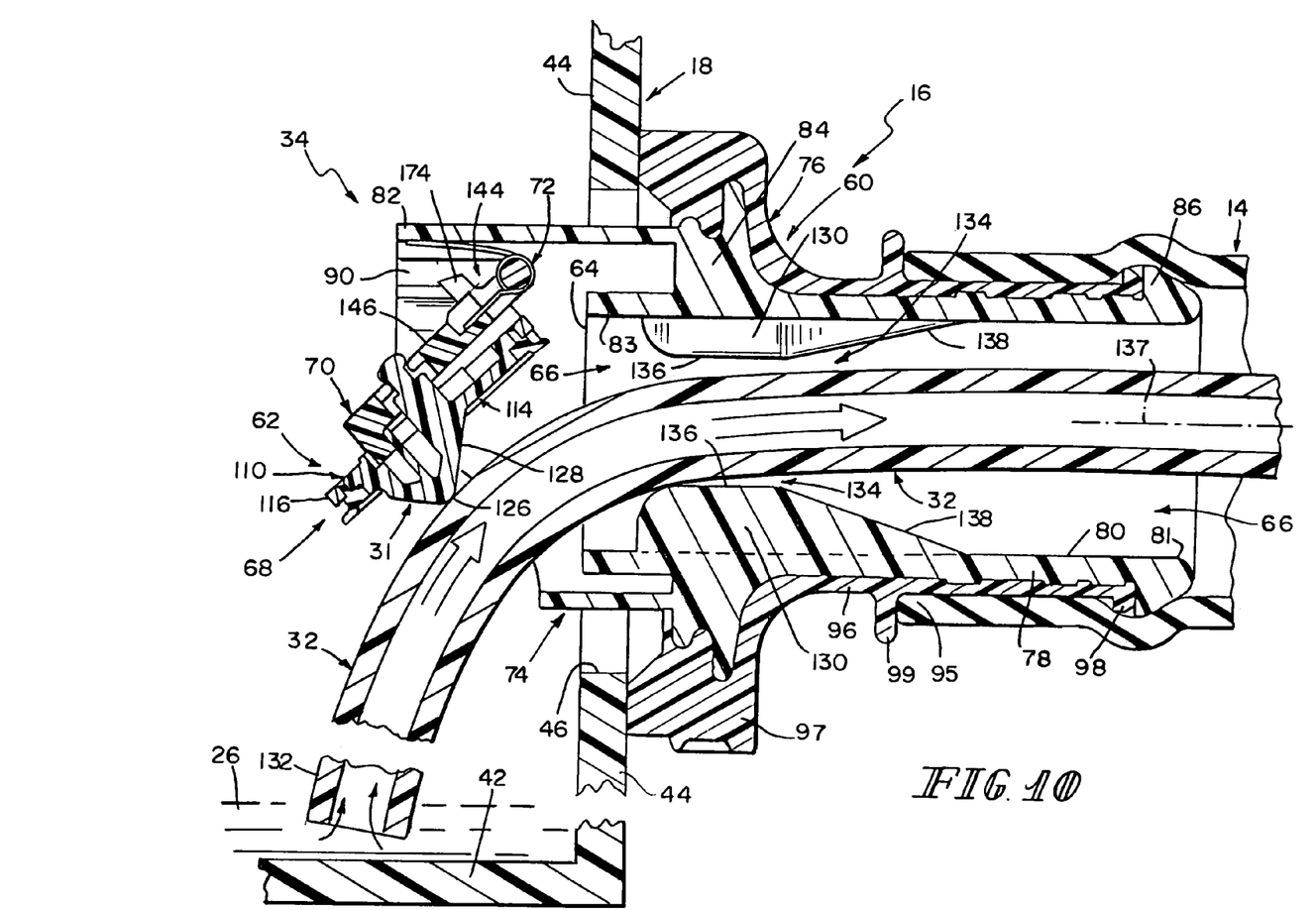
FIG. 10 is a view similar to FIGS. 8 and 9 showing a lead end (or tip) of a siphon tube fully inserted through the tank inlet check valve apparatus, a portion of a siphon tube deflector included in the diverter valve having intercepted the lead end of the siphon tube and having directed it to lie substantially adjacent to the bottom wall of the fuel tank as the siphon tube was passed down the filler neck and past the tank inlet check valve apparatus into the fuel tank, and the siphon tube functioning to remove liquid fuel from the fuel tank.

A fuel system 10 for use with a vehicle is shown in FIG. 1. Fuel system 10 includes a fuel tank 18, a vapor-venting system 20 coupled to fuel tank 18 and to a vapor-recovery device 19, and a fuel-transfer system 12 including a filler neck 14 and a fuel conductor 16 coupled to filler neck 14 and coupled to fuel tank 18 to intercept liquid fuel flowing through filler neck 14 into fuel tank 18. Filler neck 14 conducts liquid fuel 26 to fuel conductor 16 which regulates the flow of liquid fuel 26 and fuel vapor 28 between filler neck 14 and an interior region 30 of fuel tank 18. A siphon tube deflector 31 included in fuel conductor 16 intercepts and guides a siphon tube 32 inserted into fuel conductor 16 from filler neck 14 into interior region 30 of fuel tank 18, as shown in FIG. 10, to allow a mechanic to pump liquid fuel 26 from fuel tank 18 when necessary. Vapor venting system 20 regulates venting of fuel vapor 28 extant in a vapor space 34 in interior region 30 of fuel tank 18 to vapor-recovery device 19.

Fuel tank 18 includes a top wall 40, a bottom wall 42 spaced apart from top wall 40, and a side wall 44 including an inlet aperture 46 as shown in FIG. 1. Fuel conductor 16 is mounted to side wall 44 and arranged to extend or be extended through inlet aperture 46 as shown in FIG. 1. Filler neck 14 includes a mouth 48 at an outer end and a discharge outlet 50 at an inner end. Fuel conductor 16 has an outer end 54 coupled to discharge outlet 50 of filler neck 14 and an inner end 52 arranged to extend into interior region 30 of fuel tank 18. Mouth 48 is formed to receive a fuel-dispensing pump nozzle 27 during tank refueling and a closure 56 at all times other than refueling.

Figure 8:
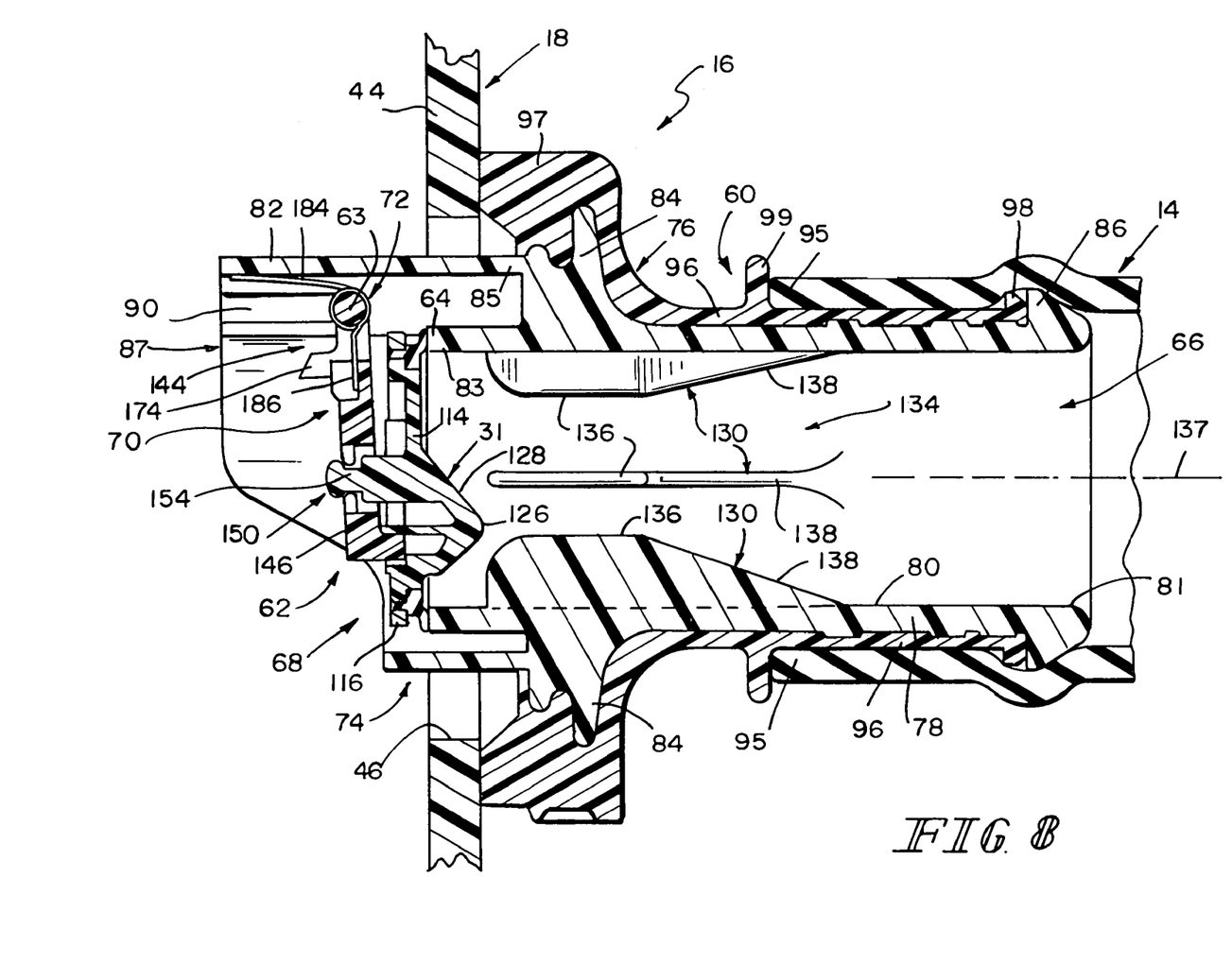
FIG. 8 is a cross-sectional view of the fuel tank, tank inlet check valve apparatus, and filler neck of FIG. 1 showing the diverter valve in a channel-closing position to block flow of liquid fuel and fuel vapor between the fuel tank and the filler neck.
Figure 9:
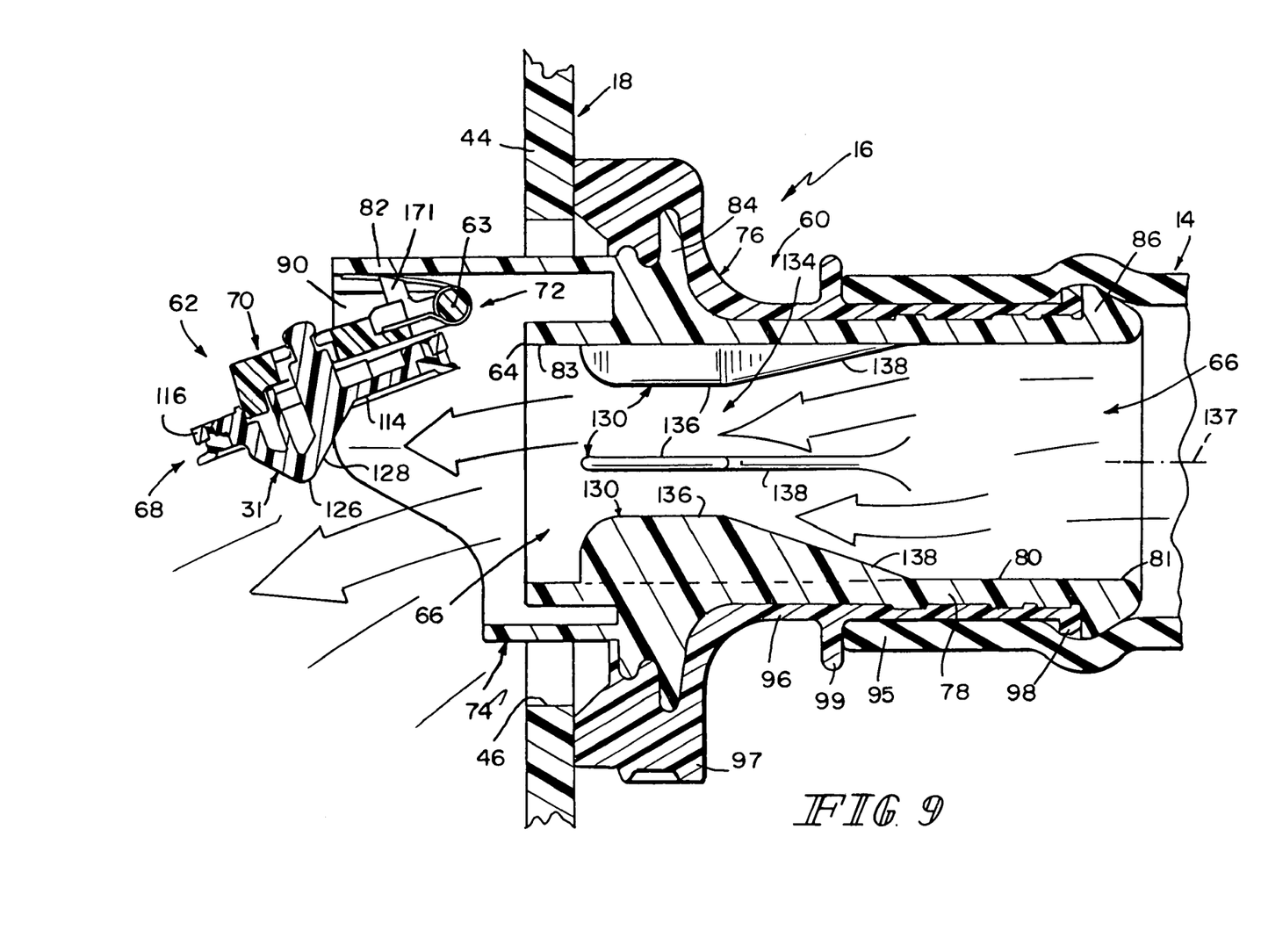
FIG. 9 is a view similar to FIG. 8 after the diverter valve has been moved to a channel-opening position by a stream of liquid fuel passing through the filler neck during refueling.

Fuel conductor 16 functions, for example, to divert the flow of liquid fuel 26 into fuel tank 18 from filler neck 14 to establish a barrier configured to block flow of liquid fuel and fuel vapor between filler neck 14 and fuel tank 18 at certain times and to intercept and guide siphon tube 32 from filler neck 14 toward bottom wall 42 of fuel tank 18 when it is necessary to remove liquid fuel from fuel tank 18 using siphon tube 32. Prior to refueling, fuel conductor 16 is configured to assume a closed position, as shown in FIG. 8. During refueling, fuel conductor 16 is configured to assume an opened position, as shown in FIG. 9, and divert liquid fuel 26 dispensed into filler neck 14 into interior region 30 of fuel tank 18. After refueling, fuel conductor 16 is reconfigured to assume the closed position shown in FIG. 8.

On occasion, it is necessary or convenient to remove liquid fuel 26 from fuel tank 18. To this end, siphon tube 32 can be inserted into fuel tank 18 and used to siphon or otherwise pump liquid fuel 26 from fuel tank 18 as shown in FIG. 10. Because liquid fuel 26 collects near bottom wall 42 of fuel tank 18, more liquid fuel 26 can be removed from fuel tank 18 if an inlet end 132 of siphon tube 32 can be positioned to lie adjacent to bottom wall 42 of fuel tank 18.

Fuel conductor 16 includes a siphon tube deflector 31 that is configured and arranged to divert and guide siphon tube 32 as tube 32 is moved through filler neck 14 toward and into fuel tank 18 as suggested in FIG. 9. Siphon tube deflector 31 diverts siphon tube 32 toward bottom wall 42 of fuel tank 18 as it is being introduced into the interior region 30 of fuel tank 18 as shown in FIG. 10. When siphon tube 32 is inserted fully into fuel tank 18, inlet end (or tip) 132 of siphon tube 32 is positioned to lie adjacent to bottom wall 42 of fuel tank 18 to enable more liquid fuel 26 to be removed from fuel tank 18.

Figure 2:
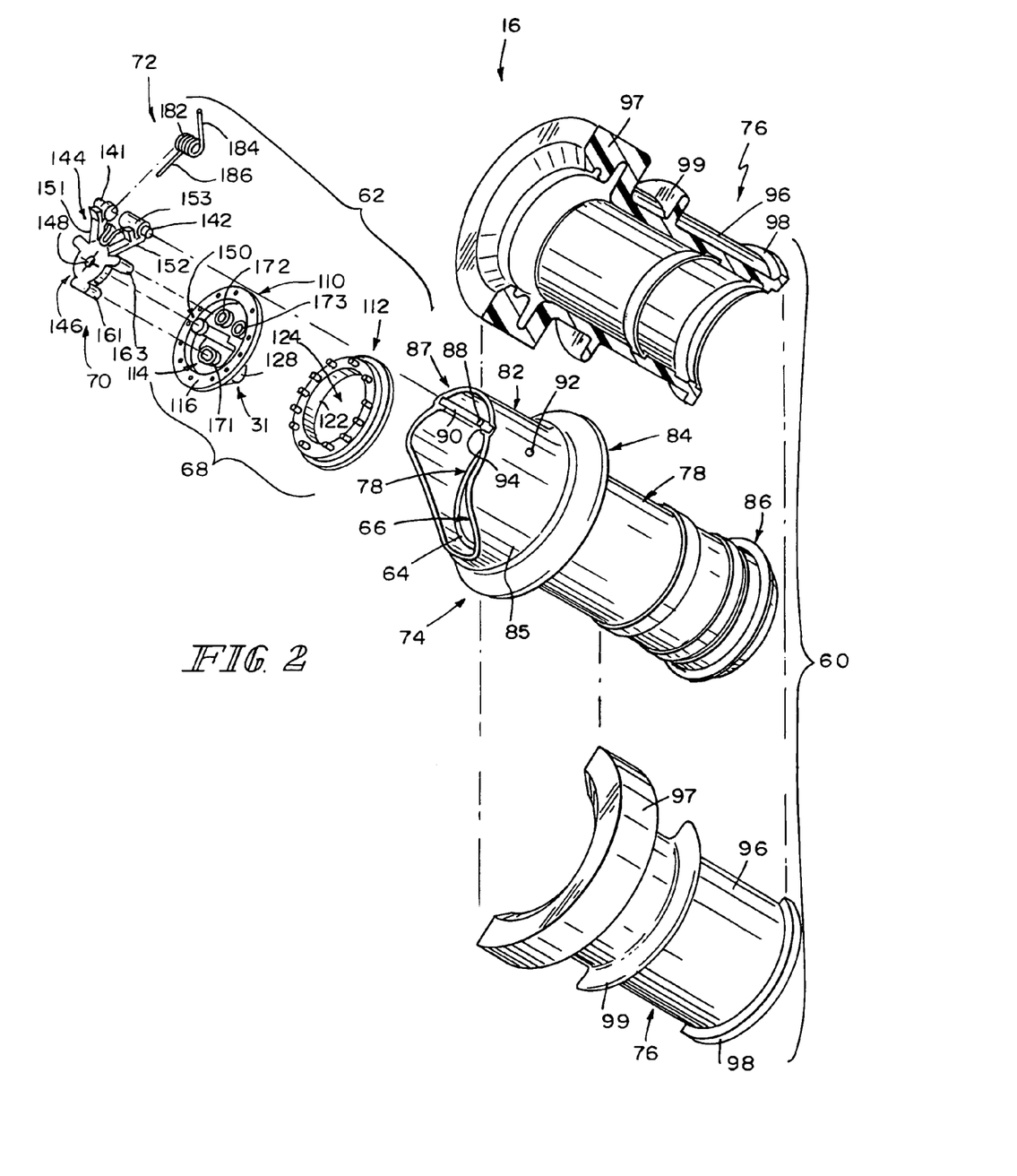
FIG. 2 is an exploded perspective assembly view of the fuel conductor of FIG. 1 showing (from left to right) a pivotable valve mover, a biasing spring for the valve mover, a two-part diverter valve including a closure and a seal ring, a valve housing, and a housing jacket cooperating with the valve housing to form a valve carrier.
Figure 3:
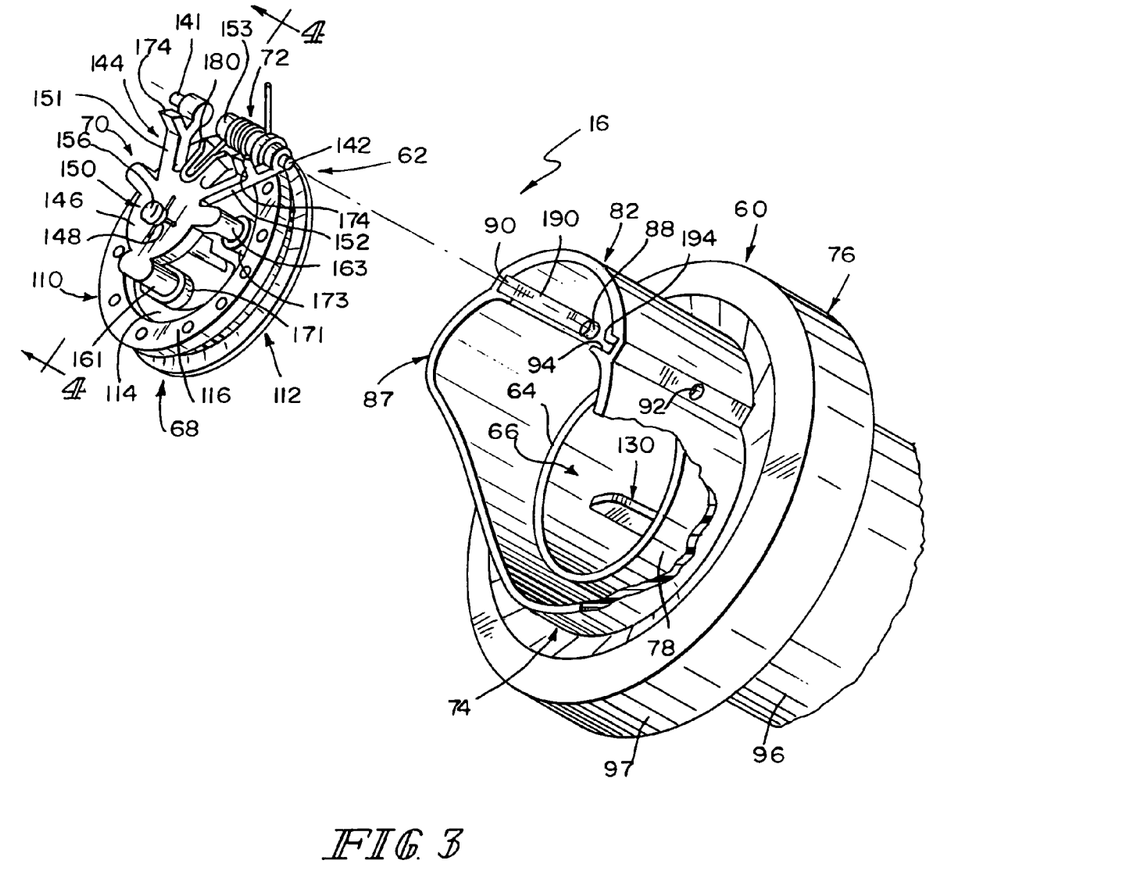
FIG. 3 is a view similar to FIG. 2 showing a subassembly comprising the diverter valve, valve mover, and biasing spring before it is mounted in the valve housing formed in the valve carrier.
Figure 4:
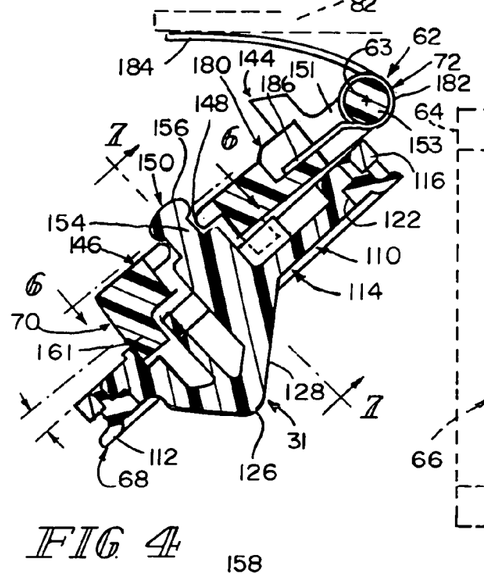
FIG. 4 is a sectional view of the valve taken along line 4—4 of FIG. 3 showing limited angular motion of the diverter valve relative to the valve mover and showing a portion of the valve housing in phantom.
Figure 5:
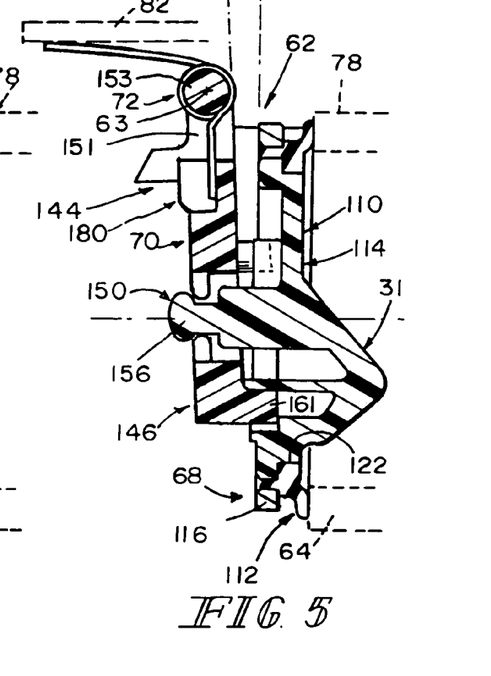
FIG. 5 is a view similar to FIG. 4 showing pivoting movement of the diverter valve under a closing force applied by the biasing spring.
Figure 6:
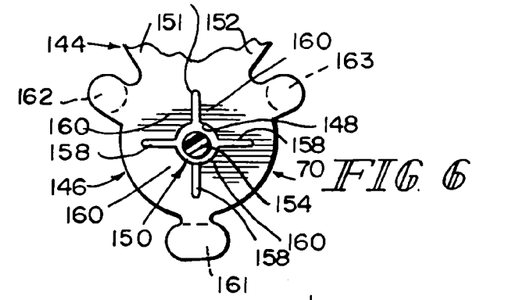
FIG. 6 is a sectional view taken along line 6—6 of FIG. 4 showing limited movement of the diverter valve relative to the valve mover owing to a "lost-motion" coupling of a mounting post included in the diverter valve and a post receiver formed in the valve mover.

Fuel conductor 16 comprises a valve carrier 60 and a tank inlet check valve apparatus 62 as suggested in FIGS. 2 and 3. Check valve apparatus 62 is coupled to valve carrier 60 for pivotable movement between a closed position shown in FIG. 8 and an opened position shown in FIG. 9. In the closed position, fuel and fuel vapor are not allowed to flow between fuel tank 18 and filler neck 14 through fuel conductor 16. However, in the opened position, fuel and fuel vapor are allowed to flow through fuel conductor 16.

Figure 7:
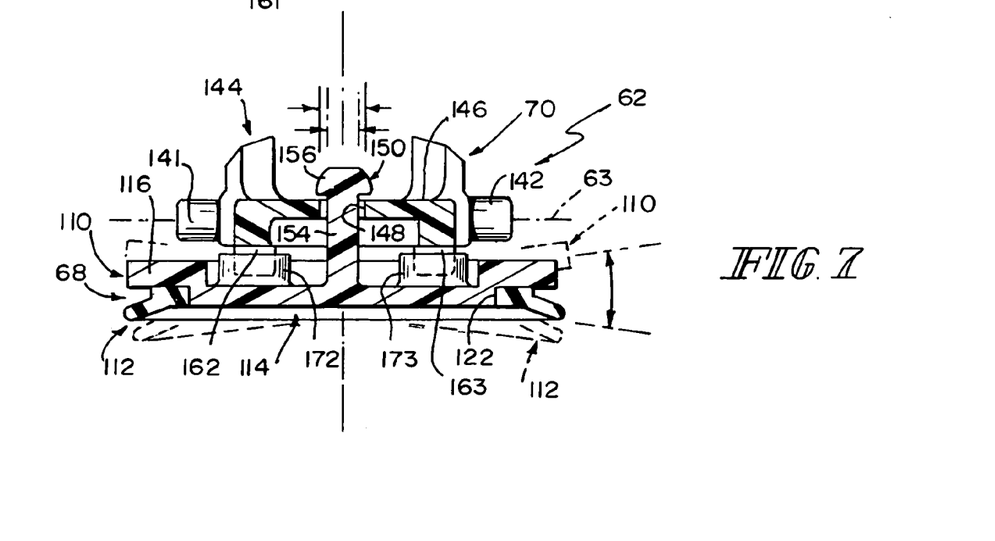
FIG. 7 is a sectional view taken along line 7—7 of FIG. 4 showing a "lost-motion" connection between a mounting post included in the diverter valve and a post receiver formed in the valve mover so as to allow rotary motion of the diverter valve relative to the valve mover in every direction (about an axis extending through the post receiver) within predetermined limits.

Valve carrier 60 is formed to include a valve seat 64 and a fuel-transfer channel 66 terminating at the valve seat 64 as shown, for example, in FIG. 8. Valve carrier 60 is adapted to be coupled to filler neck 14 and fuel tank 18 as suggested in FIGS. 1 and 8 to conduct fuel from filler neck 14 to fuel tank 18 through fuel-transfer channel 66 during vehicle refueling. Check valve apparatus 62 is pivotable about a pivot axis 63 (see FIG. 7) relative to valve carrier 60 to the closed position as shown in FIG. 8 to engage valve seat 64 to block discharge of fuel from fuel-transfer channel 66 into fuel tank 18. Check valve apparatus 62 can also pivot about pivot axis 63 to the opened position as shown in FIG. 9 to disengage valve seat 64 to allow discharge of fuel from fuel-transfer channel 66 into fuel tank 18.

Tank inlet check valve apparatus 62 comprises a diverter valve 68 configured to mate with valve seat 64 provided in valve carrier 60, a valve mover 70 pivotably coupled to valve carrier 60 at pivot axis 63 to carry diverter valve 68 toward and away from valve seat 64, an a biasing spring 72 as shown, for example, in FIGS. 2, 3, and 8. Biasing spring 72 yieldably urges valve mover 70 so as to bias diverter valve 68 normally to the closed position. In the illustrated embodiment, check valve apparatus 62 is a modular assembly and can be "snap-mounted" to valve carrier 60 using first and second pin guide slots 90, 94 and first and second pin receivers 88, 92 formed in valve carrier 60 as suggested in FIGS. 2, 3, and 8.

In the illustrated embodiment, valve carrier 60 includes a valve housing 74 and a housing jacket 76 overmolded onto valve housing 74 in the manner suggested in FIGS. 2 and 8. Valve housing 74 is made, for example, of acetyl. Housing jacket 76 is made of a permeation-resistant material such as, for example, high-density polyethylene so that it can be welded to fuel tank 18 to support valve housing 74 in a fixed position in aperture 46 formed in side wall 44. Check valve apparatus 62 is coupled to valve housing 74 for pivotable movement about pivot axis 63 in the illustrated embodiment. Valve mover 70 was designed to be snap-fit to valve carrier 60 and is made of the same material than valve housing 74 to allow unit to function better in "swell" conditions.

Valve housing 74 includes a pipe 78 having a cylindrical interior wall 80 defining a boundary of fuel-transfer channel 66 as shown, for example, in FIG. 8. One end 81 of pipe 78 is open to receive fuel from filler neck 14. Valve seat 64 is formed at an opposite downstream end 83 of pipe 78 to define an opening through which fuel is discharged from fuel-transfer channel 66 into fuel tank 18 when check valve apparatus 62 is moved to the opened position as shown, for example, in FIG. 9.

Valve housing 74 also includes an outer sleeve 82 configured to surround a downstream portion of pipe 78, which portion is formed to include valve seat 64, as shown, for example, in FIG. 8. Valve housing 74 further includes a radially outwardly extending annular pipe anchor 84 coupled to an exterior surface of pipe 78 and arranged to mate with housing jacket 76 during the overmolding process. Sleeve 82 includes a proximal end 85 coupled to annular pipe anchor 84 to retain sleeve 82 in a cantilevered position relative to valve seat 64 as suggested in FIGS. 3 and 8. A ramped collar 86 forming a sealing barb is provided on upstream end 81 of pipe 78 as shown in FIG. 8 for expanding filler neck 14 radially outwardly as filler neck 14 is coupled to valve carrier 60.

As shown in FIGS. 2, 3, and 8, an outer end portion 87 of sleeve 82 is formed to include a first pin receiver 88, a first pin guide slot 90 terminating at first pin receiver 88, a second pin receiver 92, and a second pin guide slot 94 terminating at second pin receiver 92. These guide slots 90, 94 and receivers 88, 92 are used to mount check valve apparatus 62 to sleeve 82 for pivotable movement about pivot axis 63 to open and close fuel-transfer channel 66 formed in pipe 78.

Housing jacket 76 includes an outer tube 96 arranged to surround pipe 78, a mounting flange 97 appended to one end of tube 96, and an end collar 98 appended to an opposite end of tube 96 as shown in FIG. 8. Mounting flange 97 is adapted to be coupled (using any suitable means) to side wall 44 of fuel tank 18 to fix valve housing 74 in a stationary position extending into inlet aperture 46 formed in side wall 44. It is within the scope of this disclosure to adapt valve carrier 60 for weld-on tank mounting (as shown) or for in-tank mounting. Mounting flange 97 is also configured to mate with annular pipe anchor 84 as shown, for example, in FIG. 8. A radially outwardly extending annular middle collar 99 is appended to a middle portion of tube 96 and arranged to abut a distal end 95 of filler neck 14 as shown, for example, in FIG. 8. It is within the scope of this disclosure to couple filler neck 14 to valve carrier 60 using cam locks (not shown) or a crimped connector (not shown).

Diverter valve 68 includes a closure 110 and a seal ring 112 as shown, for example, in FIGS. 2–6. Closure 110 is coupled to valve mover 70 for movement therewith. Closure 110 is made of nylon and seal ring 112 is made of fluorsilicone and overmolded onto closure 110 to provide a mechanical and chemical bond therebetween. Seal ring 112 is coupled to closure 110 to move therewith relative to valve seat 64. Biasing spring 72 is arranged yieldably to pivot valve mover 70 about pivot axis 63 to move closure 110 normally toward valve seat 64 to trap seal ring 112 between closure 110 and valve seat 64 to locate tank inlet check valve apparatus 62 in the closed position as shown in FIG. 8.

Closure 110 includes a mover mount 114 coupled to valve mover 70, a seal mount 116 coupled to a peripheral portion of mover mount 114 and coupled to seal ring 112, and siphon tube deflector 31. Siphon tube deflector 31 is coupled to mover mount 114 and arranged to extend into fuel-transfer channel 66 upon movement of seal ring 112 to engage valve seat 64. Siphon tube deflector 31 is adapted to intercept and guide a siphon tube 32 moving through filler neck 14 into fuel-transfer channel 66 toward a bottom wall 42 of fuel tank 18. Seal ring 112 includes an annular inner edge 122 and siphon tube deflector 31 is cantilevered to mover mount 114 to project through an aperture 124 defined by annular inner edge 122 as suggested in FIG. 4.

Siphon tube deflector 31 includes a ridge 126 adapted to engage a siphon tube 320 extending through filler neck 14 to reach bottom wall 42 of fuel tank 18 upon movement of tank inlet check valve apparatus 62 to the opened position to retain the check valve apparatus 62 in the opened position. Siphon tube deflector 31 also includes an inclined surface 128 arranged to extend between mover mount 114 and ridge 126 and intercept a siphon tube 32 passing through fuel-transfer channel 66 and into fuel tank 18 to move valve mover 70 against biasing spring 72 to cause check valve apparatus 62 to move to the opened position. Inclined surface 128 is angled to prevent siphon tube 32 from hitting seal ring 112 as siphon tube 32 moves through fuel conductor 16 in addition to directing siphon tube 32 into fuel tank 18.

Valve carrier 60 includes a plurality of siphon tube guides 130 coupled to interior wall 80 of pipe 78 to lie in fuel-transfer channel 66 and arranged cooperatively to define means for guiding a tip 132 of a siphon tube 32 moving in fuel-transfer channel 66 in a direction toward tank inlet check valve apparatus 62 to intercept in sequence inclined surface 128 and ridge 126 of siphon tube deflector 31 to cause check valve apparatus 62 to move to the opened position in response to continued movement of tip 132 of siphon tube 32 toward bottom wall 42 of fuel tank 18.

Siphon tube guides 130 (for example, four in number) are arranged to lie in spaced-apart relation to one another and extend toward a longitudinally extending central axis 137 of pipe 78 to define therebetween a reduced-diameter passageway 134 in fuel-transfer channel 66 sized to receive a siphon tube 32 moving in fuel-transfer channel 66 toward check valve apparatus 62 and guide that siphon tube 20 to engage siphon tube deflector 31 coupled to mover mount 114. Interior wall 80 of pipe 78 has a cylindrical shape and the plurality of siphon tube guides 130 are circumferentially spaced apart from one another about interior wall 80 as suggested in FIG. 8.

Each of siphon tube guides 130 is fin-shaped and cantilevered to interior wall 80 of pipe 78 as suggested in FIG. 8. Each of siphon tube guides 130 includes a slide edge 136 arranged to lie in substantially parallel relation to longitudinally extending central axis 137 of pipe 78 and in close proximity to valve seat 64. Each siphon tube guide 130 also includes a sloping ramp edge 138 having a leading edge merging with (or lying in close proximity to) interior wall 80 of pipe 78 and a trailing edge merging with slide edge 136 to cause sloping ramp edges 138 of siphon tube guides 130 to converge toward the longitudinally extending central axis 137 of pipe 78 in a direction toward valve seat 64 as suggested in FIG. 8.

Valve mover 70 is pivotably coupled to sleeve 82 and arranged to lie outside of fuel-transfer channel 66 as shown, for example, in FIG. 8. Valve mover 70 includes first and second pivot pins 141, 142 extending in opposite directions from one another to extend respectively into first and second pin receivers 88, 92 formed in sleeve 82.

Valve mover 70 includes a base pivoter 144 coupled for pivotable movement to valve carrier 60 at pivot axis 63 and a base 146 coupled to base pivoter to pivot therewith and formed to include a post receiver 148 as shown, for example, in FIGS. 2 and 3. Closure 110 includes an upright mounting post 150 formed to include a central axis extending longitudinally therethrough and arranged to extend through post receiver 148 formed in base 146 to retain closure 70 in coupled relation to base 146 yet allow limited movement of closure 110 relative to base 146 owing to movement of the central axis of mounting post 150 relative to pivot axis 63 during seating on valve seat 64 of seal ring 112 carried on closure 110 during movement of tank inlet check valve apparatus 62 to assume the closed position.

Base pivoter 144 includes first and second pivot arms 151, 152 cantilevered to base 146, a first pivot pin 141 coupled to first pivot arm 151 and arranged to extend into a first pin receiver 88 formed in sleeve 82 of valve carrier 60 to intersect pivot axis 63, and a second pivot pin 142 coupled to second pivot arm 152 and arranged to extend into a second pin receiver 92 formed in sleeve 82 of valve carrier 60 to intersect pivot axis 63. Post receiver 148 has an inner diameter and mounting post 150 includes a post shaft 154 that extends through post receiver 148 and has an outer diameter that is less than the inner diameter of post receiver 148 so as to allow rotary motion of diverter valve 68 relative to valve mover 70 in every direction within predetermined limits. This two-piece ball-snap design acts to enhance sealing capability of diverter valve 68 by establishing continuous and positive contact of seal ring 112 on annular valve seat 64. Diverter valve 68 is thus self-aligning using a swivel, ball and socket, and/or pivoting mount to allow for a lower load on biasing spring 72. This aids in lower pressure drops, allows for better sealing capabilities and low system pressures, improves air leaks at low pressures, and improves air flow at low pressures.

Mounting post 150 also includes a post retainer 156 that is coupled to a distal end of post shaft 154 and has an outer diameter that is larger than the inner diameter of post receiver 148 normally to block removal of post shaft 154 from post receiver 148 formed in base 146 of valve mover 70. Base 146 is formed to include at least one slit 158 (see FIG. 6) extending radially outwardly from post receiver 148 to form at least two (e.g., four) deformable sections 160 in base that deform temporarily during movement of post retainer 156 through post receiver 148 to locate post shaft 154 in post receiver 148 to couple diverter valve 68 to valve mover 70.

Valve mover 70 further includes at least one socket pin coupled to base 146 and arranged to extend toward closure 110 as suggested in FIG. 2. In the illustrated embodiment, socket pins 161, 162, 163 are provided. Closure 110 is formed to include a socket for each of socket pins 161, 162, 163 as also suggested in FIG. 2. Each socket 171, 172, 173 is configured to receive one of the socket pins 161, 162, 163 for sliding movement therein during movement of sealing ring 112 to engage and disengage valve seat 64. Three socket pins 161, 162, 163 are appended to a perimeter portion of base 146 as suggested in FIG. 3 and arranged to form vertices of a reference triangle (not shown) receiving base of valve mover 70 therein as suggested in FIG. 6. Socket pin 161 has an oblong cross-sectional shape and socket pins 162, 163 have a round cross-sectional shape as suggested in FIG. 2.

Valve mover 70 further includes a stop member 174 coupled to one of the first and second pivot arms 151, 152. Two stop members 174 are shown in the illustrated embodiment. Each stop member 174 is arranged to engage valve carrier 60 to limit pivoting movement of valve mover 70 about pivot axis 63 against biasing spring 72 in a direction away from valve seat 64 during movement of tank inlet check valve apparatus 62 to the opened position. First and second pivot arms 151, 152 are splayed and cooperate to form an acute included angle therebetween as suggested in FIG. 3.

When diverter valve 68 is pivoted in any direction with respect to valve mover 70, the limit of pivoting movement is controlled by "hard stop" engagement of socket pins 161, 162, 163 against the side walls defining sockets 171, 172, 173. These hard stops will prevent post retainer 156 of mounting post 150 from receiving excessive lateral force, which force could otherwise cause post retainer 156 to be fractured and/or broken off of post shaft 154. Pins 161, 162, 163 and sockets 171, 172, 173 are dimensioned and toleranced to prevent the "pin head" defined by post retainer 156 from "seeing" too much side load forces. Thus, minimal side load forces are applied to post shaft 154 and retainer 156 during use because each socket pin and its companion socket cooperate to define means for providing a hard stop to limit excessive pivoting movement relative to valve mover 70 during movement of tank inlet check valve apparatus 62 relative to pipe 78.

Each of the pin guide slots 90, 94 includes an inclined pin-engaging ramp as suggested in FIG. 3. Inclined pin-engaging ramps 190, 194 are arranged to converge in a direction extending toward valve seat 64 to cause first and second pivot arms 151, 152 to deform temporarily and move toward one another to guide first pivot pin 141 into first pin receiver 88 and second pivot pin 142 into second pin receiver 92 as valve mover 70 is moved toward valve seat 64 during installation of valve mover 70 in valve carrier 60 whereupon first and second pivot arms 151, 152 are allowed to move away from one another owing to a resilient characteristic thereof to retain first pivot pin 141 in first pin receiver 88 and second pivot pin 142 in second pin receiver 92.

Pivot arm 152 includes a coil support 153 as shown in FIGS. 2 and 3. Valve mover 70 includes an arm receiver 180 located between first and second pivot arms 151, 152. Arm receiver 180 holds and/or captures one arm of biasing spring 72 to avoid using alternate costly assembly methods and/or components. Biasing spring 72 is shown in FIGS. 2 and 3 and includes a coil 182 mounted on coil support 153, a housing arm 184 coupled to coil 182 and biased to engage valve carrier 60, and a mover arm 186 coupled to coil 182 and biased to engage arm receiver 180.

The invention claimed is:

1. A fuel-transfer system for a fuel system of a vehicle including a filler neck and a fuel tank including a top wall and a bottom wall spaced apart from the top wall, the fuel-transfer system comprising
    a valve carrier formed to include a valve seat and a fuel-transfer channel terminating at the valve seat and adapted to be coupled to a filler neck and a fuel tank to conduct fuel from the filler neck to the fuel tank through the fuel-transfer channel and
    a tank inlet check valve apparatus mounted on the valve carrier for pivotable movement about a pivot axis between a closed position engaging the valve seat to block discharge of fuel from the fuel-transfer channel and an opened position disengaging the valve seat to allow discharge of fuel from the fuel-transfer channel, the tank inlet check valve apparatus including a valve mover pivotably coupled to the valve carrier at the pivot axis, a diverter valve including a closure coupled to the valve mover for movement therewith and a seal ring coupled to the closure to move therewith relative to the valve seat, and a biasing spring arranged to yieldably pivot the valve mover about the pivot axis to move the closure normally toward the valve seat to trap the seal ring between the closure and the valve seat to locate the tank inlet check valve apparatus in the closed position
    wherein the valve mover further includes a base coupled to the closure and at least one socket pin coupled to the base and arranged to extend toward the closure, the closure is formed to include a socket for each of the socket pins, and each socket is configured to receive one of the socket pins for sliding movement therein during movement of the sealing ring to engage and disengage the valve seat.

2. The fuel-transfer system of claim 1, wherein the closure includes a mover mount coupled to the valve mover, a seal mount coupled to a peripheral portion of the mover mount and coupled to the seal ring, and a siphon tube deflector coupled to the mover mount and arranged to extend into the fuel-transfer channel upon movement of the seal ring to engage the valve seat and adapted to intercept and guide a siphon tube moving through the filler neck into the fuel-transfer channel toward a bottom wall of the fuel tank.

3. The fuel-transfer system of claim 2, wherein the siphon tube deflector includes a ridge adapted to engage a siphon tube extending through the filler neck to reach the bottom wall of the fuel tank upon movement of the tank inlet check valve apparatus to the opened position to retain the tank inlet check valve apparatus in the opened position and an inclined surface arranged to extend between the mover mount and the ridge and intercept a siphon tube passing through the fuel-transfer channel and into the fuel tank to move the valve mover against the biasing spring to cause the tank inlet check valve apparatus to move to the opened position.

4. The fuel-transfer system of claim 3, wherein the valve carrier includes a pipe having an interior wall defining a boundary of the fuel-transfer channel and a plurality of siphon tube guides coupled to the interior wall to lie in the fuel-transfer channel and arranged cooperatively to define means for guiding a tip of a siphon tube moving in the fuel-transfer channel in a direction toward the tank inlet check valve apparatus to intercept in sequence the inclined surface and the ridge of the siphon tube deflector to cause the tank inlet check valve apparatus to move to the opened position in response to continued movement of the tip of the siphon tube toward the bottom wall of the fuel tank.

5. The fuel-transfer system of claim 2, wherein the valve carrier includes a pipe having an interior wall defining a boundary of the fuel-transfer channel and a plurality of siphon tube guides coupled to the interior wall and arranged to lie in spaced-apart relation to one another and extend toward a longitudinally extending central axis of the pipe to define therebetween a reduced-diameter passageway in the fuel-transfer channel sized to receive a siphon tube moving in the fuel-transfer channel toward the tank inlet check valve apparatus and guide that siphon tube to engage the siphon tube deflector coupled to the mover mount.

6. The fuel-transfer system of claim 5, wherein the interior wall of the pipe has a cylindrical shape and the plurality of siphon tube guides are circumferentially spaced apart from one another about the interior wall.

7. The fuel-transfer system of claim 5, wherein each of the siphon tube guides is fin-shaped and cantilevered to the interior wall of the pipe.

8. The fuel-transfer system of claim 5, wherein each of the siphon tube guides includes a slide edge arranged to lie in substantially parallel relation to a longitudinally extending central axis of the pipe and in close proximity to the valve seat and a sloping ramp edge having a leading edge merging with the interior wall of the pipe and a trailing edge merging with the slide edge to cause the sloping ramp edges of the siphon tube guides to converge toward the longitudinally extending central axis of the pipe in a direction toward the valve seat.

9. The fuel-transfer system of claim 1, wherein the valve mover includes a base pivoter coupled for pivotable movement to the valve carrier at the pivot axis and the base is coupled to the base pivoter to pivot therewith and formed to include a post receiver and the closure includes a mounting post formed to include a central axis extending longitudinally therethrough and arranged to extend through the post receiver formed in the base to retain the closure in coupled relation to the base yet allow limited movement of the closure relative to the base owing to movement of the central axis of the mounting post relative to the pivot axis during seating on the valve seat of the seal ring carried on the closure during movement of the tank inlet check valve apparatus to assume the closed position.

10. The fuel-transfer system of claim 9, wherein the base pivoter includes first and second pivot arms cantilevered to the base, a first pivot pin coupled to the first pivot arm and arranged to extend into a first pin receiver formed in the valve carrier to intersect the pivot axis, and a second pivot pin coupled to the second pivot arm and arranged to extend into a second pin receiver formed in the valve carrier to intersect the pivot axis.

11. The fuel-transfer system of claim 9, wherein the post receiver has an inner diameter and the mounting post includes a post shaft that extends through the post receiver and has an outer diameter that is less than the inner diameter of the post receiver so as to allow rotary motion of the diverter valve relative to the valve mover in every direction within predetermined limits and a post retainer that is coupled to a distal end of the post shaft and has an outer diameter that is larger than the inner diameter of the post receiver normally to block removal of the post shaft from the post receiver formed in the base of the valve mover.

12. The fuel-transfer system of claim 9, wherein three socket pins are appended to a perimeter portion of the base and arranged to form vertices of a reference triangle receiving the base of the valve mover therein.

13. The fuel-transfer system of claim 9, wherein a first of the socket pins has an oblong cross-sectional shape and a second of the socket pins has a round cross-sectional shape.

14. The fuel-transfer system of claim 1, wherein the valve mover includes the base coupled to the closure and first and second pivot arms coupled to the base, a first pivot pin coupled to the first pivot arm and arranged to extend into a first pin receiver formed in the valve carrier to intersect the pivot axis, and a second pivot pin coupled to the second pivot arm and arranged to extend into a second pin receiver formed in the valve carrier to intersect the pivot axis.

15. The fuel-transfer system of claim 14, wherein the valve mover further includes a stop member coupled to one of the first and second pivot arms and arranged to engage the valve carrier to limit pivoting movement of the valve mover about the pivot axis against the biasing spring in a direction away from the valve seat during movement of the tank inlet check valve apparatus to the opened position.

16. The fuel-transfer system of claim 14, wherein the first and second pivot arms are splayed and cooperate to form an acute included angle therebetween.

17. The fuel-transfer system of claim 14, wherein the valve carrier is formed to include a first pin guide slot terminating at the first pin receiver and a second pin guide slot terminating at the second pin receiver, each of the pin guide slots includes an inclined pin-engaging ramp and the inclined pin-engaging ramps are arranged to converge in a direction extending toward the valve seat to cause the first and second pivot arms to deform temporarily and move toward one another to guide the first pivot pin into the first pin receiver and the second pivot pin into the second pin receiver as the valve mover is moved toward the valve seat during installation of the valve mover in the valve carrier whereupon the first and second pivot arms are allowed to move away from one another owing to a resilient characteristic thereof to retain the first pivot pin in the first pin receiver and the second pivot pin in the second pin receiver.

18. The fuel-transfer system of claim 14, wherein one of the pivot arms includes a coil support, the valve mover includes an arm receiver located between the first and second pivot arms, and the biasing spring includes a coil mounted on the coil support, a housing arm coupled to the coil and biased to engage the valve carrier, and a mover arm coupled to the coil and biased to engage the arm receiver.

19. The fuel-transfer system of claim 14, wherein three socket pins are appended to a perimeter portion of the base and arranged to form vertices of a reference triangle receiving the base of the valve mover therein.

20. A fuel-transfer system for a fuel system of a vehicle including a filler neck and a fuel tank including a top wall and a bottom wall spaced apart from the top wall, the fuel-transfer system comprising a valve carrier formed to include a valve seat and a fuel-transfer channel terminating at the valve seat and adapted to be coupled to a filler neck and a fuel tank to conduct fuel from the filler neck to the fuel tank through the fuel-transfer channel a tank inlet check valve apparatus mounted on the valve carrier for pivotable movement about a pivot axis between a closed position engaging the valve seat to block discharge of fuel from the fuel-transfer channel and an opened position disengaging the valve seat to allow discharge of fuel from the fuel-transfer channel, the tank inlet check valve apparatus including a valve mover pivotably coupled to the valve carrier at the pivot axis, a diverter valve including a closure coupled to the valve mover for movement therewith and a seal ring coupled to the closure to move therewith relative to the valve seat, and a biasing spring arranged to yieldably pivot the valve mover about the pivot axis to move the closure normally toward the valve seat to trap the seal ring between the closure and the valve seat to locate the tank inlet check valve apparatus in the closed position wherein the closure includes a mover mount coupled to the valve mover, a seal mount coupled to a peripheral portion of the mover mount and coupled to the seal ring, and a siphon tube deflector coupled to the mover mount and arranged to extend into the fuel-transfer channel upon movement of the seal ring to engage the valve seat and adapted to intercept and guide a siphon tube moving through the filler neck into the fuel-transfer channel toward a bottom wall of the fuel tank and wherein the seal ring includes an annular inner edge and the siphon tube deflector is cantilevered to the mover mount to project through an aperture defined by the annular inner edge.

21. A fuel-transfer system for a fuel system of a vehicle including a filler neck and a fuel tank including a top wall and a bottom wall spaced apart from the top wall, the fuel-transfer system comprising a valve carrier formed to include a valve seat and a fuel-transfer channel terminating at the valve seat and adapted to be coupled to a filler neck and a fuel tank to conduct fuel from the filler neck to the fuel tank through the fuel-transfer channel a tank inlet check valve apparatus mounted on the valve carrier for pivotable movement about a pivot axis between a closed position engaging the valve seat to block discharge of fuel from the fuel-transfer channel and an opened position disengaging the valve seat to allow discharge of fuel from the fuel-transfer channel, the tank inlet check valve apparatus including a valve mover pivotably coupled to the valve carrier at the pivot axis, a diverter valve including a closure coupled to the valve mover for movement therewith and a seal ring coupled to the closure to move therewith relative to the valve seat, and a biasing spring arranged to yieldably pivot the valve mover about the pivot axis to move the closure normally toward the valve seat to trap the seal ring between the closure and the valve seat to locate the tank inlet check valve apparatus in the closed position wherein the valve carrier includes a valve housing including a pipe formed to include the valve seat and the fuel-transfer channel and a sleeve surrounding a portion of the pipe formed to include the valve seat and the valve mover is pivotably coupled to the sleeve and arranged to lie outside of the fuel-transfer channel.

22. The fuel-transfer system of claim 21, wherein the valve mover includes first and second pivot pins extending in opposite directions from one another to extend respectively into first and second pin receivers formed in the sleeve and the sleeve is formed to include a first pin guide slot terminating at the first pin receiver and a second pin guide slot terminating at the second pin receiver.

23. The fuel-transfer system of claim 21, wherein the valve carrier further includes a housing jacket overmolded onto the valve housing and adapted to be coupled to a filler neck and a fuel tank and the valve housing further includes a radially outwardly extending annular pipe anchor coupled to an exterior surface of the pipe and arranged to mate with the housing jacket and the sleeve includes a proximal end coupled to the radially outwardly extending annular pipe anchor.

24. A fuel-transfer system for a fuel system of a vehicle including a filler neck and a fuel tank including a top wall and a bottom wall spaced apart from the top wall, the fuel-transfer system comprising a valve carrier formed to include a valve seat and a fuel-transfer channel terminating at the valve seat and adapted to be coupled to a filler neck and a fuel tank to conduct fuel from the filler neck to the fuel tank through the fuel-transfer channel a tank inlet check valve apparatus mounted on the valve carrier for pivotable movement about a pivot axis between a closed position engaging the valve seat to block discharge of fuel from the fuel-transfer channel and an opened position disengaging the valve seat to allow discharge of fuel from the fuel-transfer channel, the tank inlet check valve apparatus including a valve mover pivotably coupled to the valve carrier at the pivot axis, a diverter valve including a closure coupled to the valve mover for movement therewith and a seal ring coupled to the closure to move therewith relative to the valve seat, and a biasing spring arranged to yieldably pivot the valve mover about the pivot axis to move the closure normally toward the valve seat to trap the seal ring between the closure and the valve seat to locate the tank inlet check valve apparatus in the closed position wherein the valve mover includes a base pivoter coupled for pivotable movement to the valve carrier at the pivot axis and the base is coupled to the base pivoter to pivot therewith and formed to include a post receiver and the closure includes a mounting post formed to include a central axis extending longitudinally therethrough and arranged to extend through the post receiver formed in the base to retain the closure in coupled relation to the base yet allow limited movement of the closure relative to the base owing to movement of the central axis of the mounting post relative to the pivot axis during seating on the valve seat of the seal ring carried on the closure during movement of the tank inlet check valve apparatus to assume the closed position wherein the post receiver has an inner diameter and the mounting post includes a post shaft that extends through the post receiver and has an outer diameter that is less than the inner diameter of the post receiver so as to allow rotary motion of the diverter valve relative to the valve mover in every direction within predetermined limits and a post retainer that is coupled to a distal end of the post shaft and has an outer diameter that is larger than the inner diameter of the post receiver normally to block removal of the post shaft from the post receiver formed in the base of the valve mover wherein the base is formed to include at least one slit extending radially outwardly from the post receiver to form at least two deformable sections in the base that deform temporarily during movement of the post retainer through the post receiver to locate the post shaft in the post receiver to couple the diverter valve to the valve mover.

25. A fuel-transfer system for a fuel system of a vehicle including a filler neck and a fuel tank, the fuel-transfer system comprising a valve carrier formed to include a valve seat and a fuel-transfer channel and adapted to be coupled to a filler neck and a fuel tank to conduct fuel from the filler neck to the fuel tank through the fuel-transfer channel, a diverter valve configured to mate with the valve seat and formed to include a siphon tube deflector, a valve mover coupled to the diverter valve and pivotably coupled to the valve carrier at the pivot axis, the valve mover having a post receiver and at least two deformable sections that deform temporarily during movement of a post retainer through the post receiver, and a biasing spring arranged yieldably to pivot the valve mover about the pivot axis normally to move the diverter valve to mate with the valve seat to assume a closed position blocking discharge of fuel from the fuel-transfer channel through an opening formed in the valve seat and to project the siphon tube deflector into the fuel-transfer channel upon movement of the diverter valve to assume the closed position to intercept and guide a siphon tube moving through the filler neck into the fuel-transfer channel toward a bottom wall of the fuel tank.

26. The fuel-transfer system of claim 25, wherein the siphon tube deflector includes a ridge configured to provide means for engaging a siphon tube extending through the filler neck to reach the bottom wall of the fuel tank upon movement of the diverter valve to an opened position to retain the diverter valve in the opened position and an inclined surface configured to provide means for intercepting a siphon tube passing through the fuel-transfer channel and into the fuel tank to move the valve mover against the biasing spring to cause the diverter valve to move to the opened position and place the siphon tube in engagement with the ridge.

27. The fuel-transfer system of claim 26, wherein the valve carrier includes a pipe having an interior wall defining a boundary of the fuel-transfer channel and a plurality of siphon tube guides coupled to the interior wall to lie in the fuel-transfer channel and arranged cooperatively to define means for guiding a tip of a siphon tube moving in the fuel-transfer channel in a direction toward the diverter valve to intercept in sequence the inclined surface and the ridge of the siphon tube deflector to cause the diverter valve to move to the opened position in response to continued movement of the tip of the siphon tube toward the bottom wall of the fuel tank.

28. The fuel-transfer system of claim 25, wherein the diverter valve includes a sealing ring located to engage and establish a sealed connection with the valve seat upon movement of the diverter valve to mate with the valve seat and a closure including a seal mount coupled to the sealing ring, a plate coupled to the seal mount, and a mounting post extending in a first direction away from the sealing ring through a post receiver formed in the valve member to allow rotary motion of the seal mount and seal ring relative to the valve mover in every direction within predetermined limits to enhance establishment of the sealed connection between the sealing ring and the valve seat, and the siphon tube deflector is arranged to extend in a second direction opposite to the first direction to project into the fuel-transfer channel upon movement of the sealing ring to engage the valve seat.

29. The fuel-transfer system of claim 28, wherein the plate includes an interior surface closing the opening formed in the valve seat upon movement of the sealing ring to engage the valve seat and the siphon tube deflector includes a ridge adapted to engage a siphon tube extending through the filler neck to reach the bottom wall of the fuel tank upon movement of the diverter valve to an opened position and an inclined surface arranged to extend between the ridge and the interior surface of the plate to intercept a siphon tube passing through the fuel-transfer channel and into the fuel tank to move the valve mover against the biasing spring to cause the diverter valve to move to the opened position and place the siphon tube in engagement with the ridge.

30. The fuel-transfer system of claim 25, wherein the valve carrier includes a pipe having an interior wall defining a boundary of the fuel-transport channel and a plurality of siphon tube guides coupled to the interior wall and arranged to lie in spaced-apart relation to one another and extend toward a longitudinally extending central axis of the pipe to define therebetween a reduced-diameter passageway in the fuel-transport channel sized to receive a siphon tube moving in the fuel-transport channel toward the diverter valve and guide that siphon tube to engage the siphon tube deflector.

31. The fuel-transfer system of claim 30, wherein the interior wall of the pipe has a cylindrical shape and the plurality of siphon tube guides are circumferentially spaced apart from one another about the interior wall.

32. The fuel-transfer system of claim 30, wherein each of the siphon tube guides is fin-shaped and cantilevered to the interior wall of the pipe.

33. The fuel-transfer system of claim 30, wherein each of the siphon tube guides includes a slide edge arranged to lie in substantially parallel relation to a longitudinally extending central axis of the pipe and in close proximity to the valve seat and a sloping ramp edge having a leading edge merging with the interior wall of the pipe and a trailing edge merging with the slide edge to cause the sloping ramp edges of the siphon tube guides to converge toward the longitudinally extending central axis of the pipe in a direction toward the valve seat.

34. A fuel-transfer system for a fuel system of a vehicle including a filler neck and a fuel tank, the fuel-transfer system comprising a valve carrier formed to include a valve seat and a fuel-transfer channel and adapted to be coupled to a filler neck and a fuel tank to conduct fuel from the filler neck to the fuel tank through the fuel-transfer channel, a diverter valve configured to mate with the valve seat and formed to include a siphon tube deflector, a valve mover coupled to the diverter valve and pivotably coupled to the valve carrier at the pivot axis, and a biasing spring arranged yieldably to pivot the valve mover about the pivot axis normally to move the diverter valve to mate with the valve seat to assume a closed position blocking discharge of fuel from the fuel-transfer channel through an opening formed in the valve seat and to project the siphon tube deflector into the fuel-transfer channel upon movement of the diverter valve to assume the closed position to intercept and guide a siphon tube moving through the filler neck into the fuel-transfer channel toward a bottom wall of the fuel tank wherein the valve carrier includes a valve housing including a pipe formed to include the valve seat and the fuel-transfer channel and a sleeve surrounding a portion of the pipe formed to include the valve seat and the valve mover is pivotably coupled to the sleeve and arranged to lie outside of the fuel-transfer channel.

35. The fuel-transfer system of claim 34, wherein the valve carrier further includes a housing jacket overmolded onto the valve housing and adapted to be coupled to a filler neck and a fuel tank and the valve housing further includes a radially outwardly extending annular pipe anchor coupled to an exterior surface of the pipe and arranged to mate with the housing jacket and the sleeve includes a proximal end coupled to the radially outwardly extending annular pipe anchor.

36. The fuel-transfer system of claim 34, wherein the valve mover includes first and second pivot pins extending in opposite directions from one another to extend respectively into first and second pin receivers formed in the sleeve and the sleeve is formed to include a first pin guide slot terminating at the first pin receiver and a second pin guide slot terminating at the second pin receiver.

37. The fuel-transfer system of claim 36, wherein the valve mover further includes a first pivot arm carrying the first pivot pin and a second pivot arm carrying the second pivot pin, each of the pin guide slots includes an inclined pin-engaging ramp, and the inclined pin-engaging ramps are arranged to converge in a direction extending toward the valve seat to cause the first and second pivot arms to deform temporarily and move toward one another to guide the first pivot pin into the first pin receiver and the second pivot pin into the second pin receiver as the valve mover is moved toward the valve seat during installation of the valve mover in the valve carrier whereupon the first and second pivot arms are allowed to move away from one another owing to a resilient characteristic thereof to retain the first pivot pin in the first pin receiver and the second pivot pin in the second pin receiver.

38. The fuel-transfer system of claim 37, wherein one of the pivot arms includes a coil support, the valve mover includes an arm receiver located between the first and second pivot arms, and the biasing spring includes a coil mounted on the coil support, a housing arm coupled to the coil and biased to engage the valve carrier, and a mover arm coupled to the coil and biased to engage the arm receiver.

39. A fuel-transfer system for a fuel system of a vehicle including a filler neck and a fuel tank including a top wall and a bottom wall spaced apart from the top wall, the fuel-transfer system comprising a valve carrier including a pipe formed to include a fuel-transfer channel and a valve seat defining an opening into the fuel-transfer channel and a sleeve located adjacent to a portion of the pipe formed to include the valve seat, the sleeve is formed to include a first pin receiver, a first pin guide slot terminating at the first pin receiver, a second pin receiver, and a second pin guide slot terminating at the second pin receiver, and a tank inlet check valve apparatus mounted on the sleeve for pivotable movement about a pivot axis between a closed position engaging the valve seat to block discharge of fuel from the fuel-transfer channel and an opened position disengaging the valve seat to allow discharge of fuel from the fuel-transfer channel, the tank inlet check valve apparatus including first and second pivot pins extending in opposite directions from one another to extend along the pivot axis respectively into the first and second pin receivers formed in the sleeve to support the tank inlet check valve apparatus for pivotable movement about the pivot axis.

40. The fuel-transfer system of claim 39, wherein the tank inlet check valve apparatus includes a first pivot arm carrying the first pivot pin and a second pivot arm carrying the second pivot pin, each of the pin guide slots includes an inclined pin-engaging ramp, and the inclined pin-engaging ramps are arranged to converge in a direction extending toward the valve seat to cause the first and second pivot arms to deform temporarily and move toward one another to guide the first pivot pin into the first pin receiver and the second pivot pin into the second pin receiver whereupon the first and second pivot arms are allowed to move away from one another owing to a resilient characteristic thereof to retain the first pivot pin in the first pin receiver and the second pivot pin in the second pin receiver.

* * * * *